United States Patent [19]

Enomoto et al.

[11] Patent Number: 4,485,182

[45] Date of Patent: Nov. 27, 1984

[54] POWDER COMPOSITION FOR PRODUCING SINTERED CERAMIC

[75] Inventors: Ryo Enomoto; Kiyotaka Tsukada, both of Oogaki, Japan

[73] Assignee: Ibiden Kabushiki Kaisha, Oogaki, Japan

[21] Appl. No.: 516,760

[22] Filed: Jul. 25, 1983

[30] Foreign Application Priority Data

Jul. 28, 1982 [JP] Japan ................................ 57-130416
Sep. 28, 1982 [JP] Japan ................................ 57-167499

[51] Int. Cl.$^3$ ............................................. C04B 35/00
[52] U.S. Cl. ..................................... 501/151; 264/60; 264/63; 501/88; 501/97; 501/102; 501/103; 501/134
[58] Field of Search ................. 501/151, 88, 103, 134, 501/102, 97; 264/56, 60, 63, 86

[56] References Cited

U.S. PATENT DOCUMENTS 2,593,507  4/1952  Wainer ............................. 264/63 X

FOREIGN PATENT DOCUMENTS 216064  11/1957  Australia .............................. 264/86

Primary Examiner—G. L. Kaplan
Attorney, Agent, or Firm—Balogh, Osann, Kramer, Dvorak, Genova & Traub

[57] ABSTRACT

A powder composition for producing sintered ceramic, which composition contains fluororesin powder which has not been used in the prior art as one of the materials constituting a molding assistant to be blended in the composition. With this composition, it is possible to produce a high-density green molding with few molding defects under a relatively low molding pressure. The invention also provides a process for producing such a composition.

6 Claims, No Drawings

POWDER COMPOSITION FOR PRODUCING SINTERED CERAMIC

BACKGROUND OF THE INVENTION

1. Field of the Invention

This invention relates to a powder composition for producing a high-density and high-strength sintered ceramic, and a process for producing such a powder composition. More particularly, the invention relates to a powder composition with which it is possible to produce green moldings with a high density and few molding defects under a relatively low molding pressure, and a process for producing such a composition 2. Description of the Prior Art In the prior art for producing sintered ceramic, a powdered raw material is first molded into a green molding of a desired shape and then this green molding is sintered. Varied methods are known for molding the powdered raw material into a green molding of a desired shape, such as slip cast molding, extrusion molding, potter's wheel molding, rock molding and dry pressure molding. These molding methods may be roughly divided into a wet process and a dry one depending on the moisture content of the molding material during molding. In the wet molding methods, sufficient drying of the green molding is necessary, so that in these methods it is not only required to give consideration to the possible shrinkage due to drying but also there tends to occur warping or cracking of the molding during drying. On the other hand, the dry molding methods are advantageous in providing an excellent dimensional precision, but in case of using a fine powder, it is found difficult to uniformly fill and press the material in a mold because of poor fluidity of the powder. These methods, therefore, tend to cause scattering of the bulk density of the green molding or pressure distribution during molding and to invite defects originating in or associated with bridging in the green molding. The defects incurred during molding remain in the sinter to adversely affect its properties, especially mechanical strength. Therefore, in using a finely powdered material for forming a green molding, it has been usual to granulate the material in advance for bettering its fluidity.

From the viewpoint of handling ease such as fluidity, it is desirable that the granules are high in bulk density and hard, but in order to obtain a high-density and high-strength sinter by pressure molding granulated material, it is important that individual granules are completely crushed in the course of the pressure molding so that an integral green molding is formed. To this end, usually granules which are relatively low in bulk density and soft are required because those of a high bulk density and a high hardness are hard to crush so that an extremely high molding pressure is required in molding such granules. Further, voids tend to remain in the green molding, making it difficult to obtain a high-strength sinter.

However, granules of too low a bulk density tend to break into powders again when handled, and because of an excessively high compression ratio at the time of molding, lamination tends to occur due to the air trapped in the mold. Also, a long time is required for the molding. Thus, an efficient production of green moldings is difficult with these granules.

As a means for improving these points, it is a common practice to use a lubricant for bettering the transmission of molding pressure and thereby improving the moldability.

As the lubricant, the following materials are known usable: carbowax, diglycol stearate, stearic acid, magnesium stearate, zinc stearate, barium stearate, aluminum stearate, a mixture of mineral oil and fat, paraffin emulsion, wax emulsion, glycerol or polyethylene wax.

For example, Japanese Patent Laid-Open No. 78609/1975, claiming a priority based on its original U.S. patent application Ser. No. 409,073 of Oct. 24, 1973, discloses a method in which aluminum stearate is added as a lubricant in pressure molding silicon carbide of a submicron particle size to form a green molding. According to this method, however, the green molding formed under a molding pressure of 5,000 p.s.i. (approximately 351.5 kg/cm$^2$) by a die press has a density corresponding to 55% of the theoretical value, and the green molding formed by a hydrostatic press under a molding pressure of 30,000 p.s.i. (approximately 2,109 kg/cm$^2$) has a density corresponding to 59% of the theoretical value, so that with this method an extremely high molding pressure is required for obtaining a high-density green molding.

As discussed above, a ceramic sintering powder for use in a dry molding method is required to have an excellent moldability for obtaining a high-density sinter and, for this purpose, such a powder is usually incorporated with a lubricant and granulated. In case an extremely fine powder is used as the ceramic sintering powder and granulated, the obtained granules prove to be very hard to break because of strong interparticle cohesion, and use of a hitherto known lubricant can not provide a significant improvement in the moldability. Thus, it has been difficult to mold an extremely fine ceramic sintering powder by a conventional dry molding technique to obtain a high-density and high-strength sinter.

SUMMARY OF THE INVENTION

An object of the present invention is to provide a powder composition with which it is possible to produce a desired sintered ceramic free from prior art defects such as those mentioned above, and a process for producing such a powder composition.

According to this invention, the above object can be attained by providing a power composition for producing a sintered ceramic comprising 100 parts by weight of a finely divided ceramic powder composed of one or more components and 0.5 to 15 parts by weight of a fluororesin, and a process for producing such a powder composition which comprises feeding 100 parts by weight of a finely divided ceramic powder composed of one or more components and 0.5 to 15 parts by weight of a fluororesin into a liquid dispersion medium so that the volume ratio of a solid content consisting of the ceramic powder and fluororesin in the suspension will be within the range of 5 to 50%, subjecting the suspension to a uniform dispersion treatment by adding, if necessary, a dispersant, giving the suspension a pressure difference enough to prevail over the stagnation of a sieving action due to a pressure loss caused between portions of the suspension on the fore side and the rear side of a sieve, and passing the suspension through the sieve having a mesh size of 65 μm or less while giving, if necessary, vibration to the suspension.

DETAILED DESCRIPTION OF THE INVENTION

As a result of the extensive studies on the action and effect of the hitherto known lubricants, the present inventors have reached a conclusion that the difficulty in improving the moldability of an extremely fine ceramic sintering powder by use of a known lubricant is attributable to the following facts. The hitherto known lubricants are liquid, greasy or in the form of a relatively soft semi-solid, so that in case of using such a lubricant for a fine powder having a large number of interparticle contact points, the lubricant staying between the particles rather acts to bind these particles to produce an effect contrary to its normal lubricating action. Also, when a conventional lubricant is mixed with an extremely fine powder such as one used in this invention, the lubricant is usually dissolved in advance in a solvent for the purpose of attaining uniform mixing, so that the mixture, when dried, tends to assume a condition where the particles are bound to each other by the lubricant.

As described above, when a conventional lubricant is mixed with an extremely fine powder, the lubricant rather acts to bind the particles than gives a lubricity between them, so that, in such a case, it is hard to reduce frictional resistance between the particles and a very high molding pressure is required for obtaining a green molding with a high theoretical density.

Thus, an extremely high molding pressure has been required for obtaining a high-density green molding with the prior art, and it was therefore necessary to use a mold stout enough to withstand the high molding pressure. The mold used for such molding was short in service life because of rapid wear in use under such a high molding pressure.

Now, as a mixing means for obtaining a sintering material composition, the present inventors used in formerly a ball mill loaded with fluororesin balls as mixing medium. The present inventors studied effects of kinds of sintering assistants and mixing conditions on sintering properties of the sintering material compositions, and further studied the use of solid carbon powders as the sintering assistants. The inventors crushed the solid carbon powders in the ball mill for many hours to promote dispersive property and reactivity of the solid carbon powders. The result of the experiment was that larger amounts of fluororesin were mixed in the ceramic composition, because balls of fluororesin were worn out. However, the fluororesin is very expensive and the sintering material composition including a large amount of the fluororesin becomes highly costly. Avoiding to admix the expensive fluororesin to the ceramic composition, the inventors exchanged the ball of fluororesin for a ball of silicon carbide sinter and tested the same experiment as used for the ball of fluororesin. The result of the experiment was that comparing to the ceramic compositions produced by using the ball of silicon carbide sinter, the ceramic compositions produced by using the ball of fluororesin had excellent moldability. Also, by comparison to the sinter made from the ceramic compositions produced by using the ball of silicon carbide sinter, sinter made from the ceramic compositions produced by using the ball of fluororesin had much higher strength.

The present inventors have made further studies on this phenomenon, and surmising that the fluororesin mingled in the composition might exert a certain influence on the moldability of the composition, they tried mixing a fluororesin with a fine ceramic powder and compression molding this mixed composition. As a result, it was found quite surprisingly that a hard fluororesin, which has not been even imagined to have a lubricating effect for improving the moldability of fine powders, does have a very excellent lubricating effect and can amazingly improve the moldability in comparison with the hitherto known lubricants to enable easy production of a high-density green molding, and this finding has led to the attainment of the present invention.

The fluororesin-containing powder composition for producing sintered ceramic according to this invention enables, owing to its very excellent moldability, easy obtainment of a green molding of an extremely high density, which has been quite difficult to obtain with the prior art techniques, under a relatively low molding pressure.

The splendid moldability of the fluororesin-containing fine ceramic powder according to this invention is considered ascribable to the facts that the fluororesin is a very hard and high-tenacity resin which does not act to bind or join the particles as the conventional lubricants do, and that this resin is very small in the coefficient of surface friction and shows excellent lubricating properties in the powdery form.

In the composition of this invention, it is essential that fluororesin be contained in an amount of 0.5 to 15 parts by weight to 100 parts by weight of fine ceramic powder composed of one or more components. This is for the following reason. If the fluororesin content is less than 0.5 part by weight, the resulting composition proves to be very poor in moldability and an excessively high pressure is required in forming a green molding. Also, the bulk density of the green molding and the pressure distribution at the time of molding tend to scatter, making it difficult to obtain uniform green moldings with few defects. On the other hand, if the resin content exceeds 15 parts by weight, the density of the green molding lowers excessively because of too much fluororesin in the green molding and it becomes impossible to obtain a high-density sinter. In view of the above, a particularly preferred range of the fluororesin content is from 2 to 10 parts by weight.

The fluororesin used in this invention preferably comprises at least one substance selected from polytetrafluoroethylene, polytrifluorochloroethylene, tetrafluoroethylene/hexafluoropropylene copolymer, polyvinylidene fluoride, and ethylene/fluoroxylene copolymer.

In this invention, it is desirable that the fluororesin is a finely divided powder having an average particle size of 3 μm or less. This is because if the average particle size of said powder is greater than 3 μm, it is impossible to attain a uniform dispersion of the resin powder in spite of its rather small content, resulting in a non-uniform lubricating effect. Also, voids tend to form in the produced sinter to adversely affect its structural strength.

The ceramic powder used in this invention can be prepared from various types of material, but it is desirable to use a material which has as its principal ingredient at least one substance selected from carbides, nitrides, oxides and their compounds. The carbides usable for this purpose include, for example, silicon carbide, boron carbide, aluminum carbide, tungsten carbide, titanium carbide, tantalum carbide and zirconium carbide. As the nitrides, silicon nitride, boron nitride, aluminum nitride, titanium nitride, zirconium nitride and the like may be used. Exemplary of the oxides usable in this invention are steatite, forsterite, alumina, zircon, beryllia, magnesia, mullite, cordierite, aluminum titanate, and zirconia.

The ceramic powder to be incorporated in the composition according to this invention is preferably a finely divided powder having an average particle size of 2 $\mu$m or less. In the case of a ceramic powder having an average particle size greater than 2 $\mu$m, a known lubricant may be used to well improve the moldability of the powder because of a relatively small number of particle contact points.

For the purpose of this invention, a fine ceramic powder composed principally of a fine powder of silicon carbide having a specific surface area of 5 to 100 m$^2$/g and a sintering assistant (which is added when necessary) is best suited.

The silicon carbide powder used in this invention may comprise at least one of the following three crystal types: $\alpha$ crystal, $\beta$ crystal and amorphous. Particularly, it is advantageous to use a fine powder of silicon carbide constituted principally from $\beta$ crystals for producing a high-strength non-pressurized silicon carbide sinter. Especially a silicon carbide powder containing more than 80% by weight of $\beta$ crystals is suited.

The sintering assistant, which is added as required, is usually a densifying assistant or a carbonaceous additive or a combination thereof.

As the densifying assistant, it is usually advantageous to use a boron-containing additive. It is also possible to use an additive containing beryllium, aluminum or the like. In the case of a boron-containing additive, it is advantageous to add at least one of boron and boron carbide in an amount of 0.1 to 3.0 parts by weight, in terms of the boron content, to 100 parts by weight of the silicon carbide powder.

The carbonaceous additive used as sintering assistant in this invention may be of any known type of carbonaceous preparations which are in the form of carbon at the start of sintering. For example, at least one preparation selected from phenol resin, coal tar pitch, polyphenylene, polymethylphenylene, carbon black and acetylene black may be used advantageously in an amount of 0.3 to 4.0 parts by weight, in terms of the fixed carbon content, to 100 parts by weight of the silicon carbide powder.

In case of using a fine powder of silicon carbide as the ceramic powder in this invention, it is desirable to use either polyvinylidene fluoride or ethylene/fluoroethylene copolymer of a combination thereof as the fluororesin. The reason is that both polyvinylidene fluoride and ethylene/flouroethylene copolymer have —CF$_2$— groups and —CH$_2$— groups in the resin so that hydrogen fluoride gas is formed when said resin in pyrolyzed during sintering, and this gas serves to expel SiO$_2$ film from the silicon carbide powder surface to appreciably improve the sintering characteristic of the silicon carbide powder.

In this invention, it is imperative that the composition is in the form of granules with a good fluidity, and it is desirable that such granules have a powder bulk density equivalent to 5 to 46% of the theoretical and an average particle size within the range from 0.02 to 0.08 mm.

The reason for defining the powder bulk density within the range is that if it is less than 5%, the compression ratio of the powder at the time of molding elevates excessively to make the molding operation difficult to carry out, while when it is greater than 46%, there are a case where the particle size distribution of the granules is relatively broad and a case where the apparent granule density is high, and in the former case the fluidity of the composition is poor and in the latter case the crush strength of the granules becomes so high that a substantial portion of the granules cannot be crushed but remain in the form as they are during molding, thus providing sites having a markedly low density in the sinter. The preferred range of the powder bulk density of the granules is from 10 to 40%. The term "powder bulk density" used herein means the volume of the ceramic powder present in a given volume of the granules, that is, the volume of the ceramic powder present in a unit volume of granules including solids, internal space and external space, and the term "apparent granule density" means the volume of the ceramic powder present in a unit bulk volume, the "bulk volume" meaning the volume of the ceramic powder and the internal space in the granules.

The definition of the preferred range of average particle size of the granules to 0.02 to 0.8 mm is based on the fact that if the average particle size of the granules is smaller than 0.02 mm, their fluidity is very low, causing a scatter in bulk density of green moldings or pressure distribution at the time of molding or defects originating in or relating to bridging in the green molding, while if it is greater than 0.8 mm, it is difficult to form a green molding of a small size and a complicate configuration.

The composition according to this invention may contain a known molding assistant. Such a molding assistant is blended in the sintering powder to serve as a lubricant or a binder in the molding operation to show the effect of reducing the molding defects which the green molding may suffer. Among the molding assistants usable for this purpose, those which specifically show the effect as a lubricant are carbowax, magnesium stearate, barium stearate, aluminum stearate, zinc stearate, and stearic acid, and those which show the effect as a binder are, for example, starch, dextrin, gum arabic, casein, molasses, sodium carboxymethylcellulose, methylcellulose, polyvinyl alcohol, polyvinyl methyl ether, polyacrylamide, tannic acid, liquid paraffin, wax emulsion, ethylcellulose, polyvinyl acetate, and phenolic resin. Cellulose acetate, glycerol and polyethylene glycol are examples of those molding assistants which show the effect both as a lubricant and as a binder. One or more of these molding assistants may be incorporated in the composition.

Now, the process for producing the powder composition for producing sintered ceramic according to this invention will be described.

In the production process or in the handling of the powder composition according to this invention, there is a chance of contamination with a relatively coarse foreign matter and the fluororesin powder particles may be combined to form coarse agglomerates and, if a sinter is produced by using the composition containing such coarse foreign matter or coarse resin agglomerates, the produced sinter tends to have voids and other relatively large immanent defects which are causative of serious deterioration of the properties, espectially bending strength, of the sinter. Therefore, especially when it is desired to obtain a high-strength and high-reliability sinter, it is imperative that the composition used is free of any coarse foreign matter or coarse agglomerates of the fluororesin.

The process of this invention is capable of inhibiting any foreign matter from mingling in said fluororesin-containing powder composition and can also prevent the agglomeration of the fluororesin particles in said composition to keep such resin particles always in a uniformly dispersed state.

According to the process of this invention, 100 parts by weight of a fine ceramic powder composed of one or more components and 0.5 to 15 parts by weight of a fluororesin are changed in a liquid dispersion medium to form a suspension in which the volume ratio of the solid matter consisting of the ceramic powder and fluororesin is within the range of 5 to 50%, and this suspension is subjected to a uniform dispersion treatment by adding, if necessary, a suitable dispersant. The suspension is then given a pressure difference sufficient to overcome the stagnation of a sieving action due to a pressure loss produced between the portions of said suspension in the front and rear sides of the sieve, and then the suspension is passed through a sieve having a mesh size of 65 μm or less while giving, in necessary, a vibration to the suspension to thereby produce a powder composition for producing a sintered ceramic.

According to this invention, the composition can be obtained by mechanically mixing said fine ceramic powder and fluororesin powder in a known mixer. In another method, the ceramic powder may be supplied a fluororesin-made mixer or a mixer containing a mixing medium composed of a fluororesin so that the ceramic powder will be mixed with a fine fluororesin powder formed due to wear of said mixer or mixing medium during the mixing operation. As the mixer, it is advantageous to use a ball mill having Teflon balls as mixing medium, a vibration mill or an attritor.

According to this invention, the volume ratio of the solid matter consisting of a fine ceramic powder and a fluororesin in the suspension is adjusted to be within the range of 5 to 50% and, after performing a uniform dispersion treatment on the suspension by adding, if necessary, a dispersant, a pressure difference is given for overcoming the stagnation of the sieving action due to a pressure loss produced between the portions of the suspension in the front and rear sides of the sieve, and then the suspension is passed through the sieve having a mesh size of 65 μm or less while giving, if necessary, vibrations to the suspension, whereby it is possible to eliminate causes of the relatively serious immanent defects to the sinter, such as formation of voids or the presence of contaminants which can adversely affect the strength of the sinter.

According to this invention, a mixture consisting of a fine ceramic powder and a fluororesin is fed to a liquid dispersion medium and, in this case, it is necessary that the volume ratio of the solid matter consisting of the ceramic powder and fluororesin in the suspension is kept within the range from 5 to 50%. This is because if the volume ratio is higher than 50%, it becomes difficult to uniformly disperse the ceramic powder and fluororesin, and also the viscosity of the suspension increases to inhibit an effective passage of the suspension through the sieve. If the volume ratio is below 5%, although the uniform dispersibility of the ceramic powder and fluororesin is improved, a great volume of suspension must be put to the sieving treatment in one operation at a low substantial throughput per unit system, resulting in poor economy. The best result is obtained when said volume ratio is within the range from 10 to 40%.

In this invention, the following substances may be used as the dispersion medium: acetone, methanol, ethanol, hexane, heptane, nonane, toluene, xylene, ethyl methyl ketone, methyl isobutyl ketone, ethylbenzene, ethylene glycol, trichloroethylene, cyclohexane, nitromethane, nitroethane, isopropyl alcohol, benzene, carbon tetrachloride and water. These substances may be used either alone or in combination.

In this invention, a dispersant may be added in the suspension if necessary. In case water is used principally as the dispersion medium, it is advantageous to use as the dispersant at least one substance selected from amines, organic compounds having a carboxyl group, those having a sulfo group, esters, ammonium compounds, organic compounds having an ether linkage, carboxylates, aluminates, phosphates, complex phosphates, sulfonates and silicates. The particular examples of these substances are tetramethylammonium hydroxide, monoethanolamine, monoethylamine, diethylamine, trimethylamine, propylamine, isobutylamine, monobutylamine, di-n-propylamine, tannic acid, sodium alginate, ammonium alginate, polyacrylic acid, polyacrylamide, polyacrylate ester, ammonium polyacrylate, sodium ligninsulfonate, ammonium ligninsulfonate, sodium aluminate, ammonium aluminate, water glass, fatty acid salts, alkylbenzenesulfonates, straight-chain alkylbenzenesulfonates, α-olefinsulfonates, sulfonates of naphthalene/formalin condensates, and polyoxyethylene alkylphenyl ether, and these substances may be used either alone or in admixture. The pH of the suspension may be adjusted with ammonia water or other suitable material to improve the state of dispersion. It is advantageous to control the pH of the suspension within the range from 5.5 to 11. In case an organic liquid is used as the dispersion medium, it is advantageous to use as the dispersant at least one substance selected from amines organic compounds having a carboxyl group, those having a sulfo group and esters. The particular examples of such substances are polyoxy fatty acid amides, sorbitan fatty acid esters, salts of dialkyl sulfosuccinates, fatty acids, alkylamine salts, benzenesulfonic acid, polyoxysorbitan fatty acid esters, polyoxyethylene glycerol fatty acid esters, polyethylene glycol fatty acid esters, pentaerythritol fatty acid esters, propylene glycolic acid esters, sucrose fatty acid esters, fatty acid alkanolamides, and amine oxides, and these substances may be used either alone or in combination.

The dispersant has the effect of inhibiting agglomeration or breaking up the agglomerates of the ceramic powder and fluororesin in the suspension to allow uniform dispersion of said ceramic powder and fluororesin having different specific gravities and particle sizes. Such a dispersant is also useful for lowering the viscosity of the suspension to facilitate the passage of the suspension through the sieve.

According to this invention, the dispersant is added where necessary in an amount preferably within the range from 0.05 to 15 parts by weight to 100 parts by weight of the total amount of the ceramic powder and fluororesin. This is because, if the amount of the dispersant added is less than the above-defined range, there is provided no desired effect of sufficiently breaking up the agglomerates of the ceramic powder or fluororesin in the suspension to maintain a uniformly dispersed state, while allowing the effective passage of the suspension through the sieve. Addition of the dispersant in excess of the above range is not only uneconomical (because no extra effect is provided by any excess addition of the dispersant) but also allows the dispersant to remain in the sintering material to give an adverse influence to the sintering operation.

In this invention, a uniform dispersion treatment of the suspension is necessary before it is passed through a sieve. This is for the following reason. Since both ceramic powder and fluororesin used in this invention are strongly agglomerative and remain in a relatively firmly agglomerated state even when placed in a liquid dispersion medium, it is impossible to pass the suspension effectively through the sieve and to keep the fluororesin in a uniformly dispersed state unless the agglomerates are sufficiently broken up.

It is advantageous to perform the uniform dispersion treatment by using at least one dispersing device selected from vibration mill, attritor, ball mill, colloid mill, Henschel mixer and high-speed mixer. Conventional dispersing methods such as impeller or screw stirring can not effect sufficient break-up of the agglomerates to allow effective passage of the suspension through the sieve, whereas the dispersing devices can give an extremely strong shearing force to provide a dispersing force strong enough to permit easy and short-time attainment of the desired uniformly dispersed state of the suspension.

According to this invention, the suspension is allowed to pass through the sieve effectively and quickly as it is given a pressure difference that can prevent the sieving action from becoming sluggish due to the pressure loss caused between the portions of the suspension in the front and rear sides of the sieve.

According to this invention, the pressure applied to the suspension present in front of the sieve (that is, the portion of the suspension which is to be passed through the sieve) is preferably varied at a period within the range from 1/400 to 5 seconds. The merit provided by varying the pressure applied to the suspension in front of the sieve is that it can greatly disturb the flow of the suspension to further improve the dispersibility of the ceramic powder and fluororesin in a sieving section while preventing the agglomeration of the particles to permit effective passage of the suspension through the sieve. The reason for regulating the period of pressure variation within the range from 1/400 to 5 seconds is that if said period is shorter than 1/400 second, the pressure variation in the suspension can not be transferred fast enough to allow effective passage of the suspension through the sieve, while if it is longer than 5 seconds, the suspension flow in the sieving section can not be disturbed to a sufficient degree to produce the desired effect of pressure variation. A particularly preferred range of said period is from 1/100 to 2 seconds.

According to this invention, the difference between maximum and minimum values of the pressure applied to the suspension in front of the sieve is at least 0.3 kg/cm², and the best result is obtained when the pressure difference between the fore and the rear sides of the sieve is within the range from 0.2 to 5 kg/cm² in case the maximum pressure was applied to the suspension on the fore side of the sieve and within the range from −0.5 to 2 kg/cm² in case the minimum pressure was applied to the suspension on the fore side of the sieve. The "pressure difference" is a value given by deducting the value of the pressure applied to the suspension in the rear (that is, on the rear side) of the sieve from that of the pressure applied to the suspension in front (that is, on the fore side) of the sieve.

Various means are available for applying pressure to the suspension, but a means using a pulsating pump is most advantageous, because it can apply pressure while giving a pressure variation to the suspension and at the same time giving vibrations thereto. A diaphragm pump can be conveniently used as such a pulsating pump.

According to this invention, the suspension is vibrated if necessary. Vibration of the suspension is helpful for preventing the agglomeration of the ceramic powder and fluororesin in the suspension to ensure uniform dispersion of said materials. Also, by giving vibrations of a pertinent strength to the suspension, it is possible to markedly reduce the viscosity of the suspension to facilitate passage of the suspension through the sieve.

The vibration given to the suspension is preferably of a frequency within the range from 1 to 400 Hz for the following reason. If the vibration frequency is lower than 1 Hz, it is difficult to maintain uniform dispersion of the suspended materials or to reduce the viscosity of the suspension, while it is higher than 400 Hz, the transfer of the vibration into the suspension becomes very sluggish to make it unable to maintain uniform dispersion of the suspended materials or to reduce the viscosity of the suspension as in the case of too low a frequency. The best result if obtained when the suspension is vibrated at a frequency of 2 to 100 Hz.

To vibrate the suspension, it is advantageous to employ at least one of the following types of vibration: one given by a mechanical means, one given by an electromagnetic means and one given by a pulsating pump.

The sieve used in this invention must be one which has a mesh size of 65 μm or less. If the mesh size of the sieve is greater than 65 μm, it is impossible to remove coarse foreign matter which adversely affects the properties of the sinter and to attain uniform dispersion of the fluororesin, making it impossible to obtain a high-strength and high-reliability sinter. To obtain a sinter of an even higher strength and higher reliability, it is advantageous to select a sieve of a mesh size less than 44 μm. It is desirable to use a sieve of a mesh size as small as possible for the purpose of removing the foreign matter in the mixture, but actually the foreign matter of such a small size that can pass meshes of 5 μm does not give any significant influence to the strength of the sinter. Also, if a sieve with a mesh size smaller than 5 μm is used, an excessively long time is required for passing the whole lot of material through the sieve. In view of these facts, it is advantageous that the mesh size of the sieve used in this invention is within the range from 5 to 44 μm.

According to this invention, the powder composition in the suspension which has been passed through the sieve is preferably granulated after or while separating the dispersion medium to improve the fluidity of the composition.

For granulating the composition, it is possible to use, for example, a tablet method, a direct granulating method, a granulating method by means of spray drying or a granulating method in which the material is first spray frozen and then freeze-dried.

In this invention, it is advantageous to pressure mold the composition to form a green molding with a density equivalent to at least 45% of the theoretical value. This is because, if the density is lower than 45%, there are not provided enough contact points of the ceramic powder particles to effectuate a uniform progress of thermal shrinkage in the sintering operation. This not only makes it difficult to obtain a high-density sinter but also causes a wide scatter in the properties such as the density of the sinter, making it difficult to obtain a high-strength sinter. Where a sinter of an especially high strength is required, the density of the green molding should be made higher than 50%.

The present inventors found that a ceramic sinter with an extremely high strength can be obtained when the amount of the fluororesin added (F parts by weight) in the composition is within the range defined by the following relationship with the average particle size (d μm) of the fluororesin and the molding pressure (P t/cm²):

$$F \geqq \frac{0.063}{P} (d + 0.3)^2 + 0.48$$

For pressure molding of the composition, it is advantageous to use a die press molding method or a hydrostatic press molding method.

According to this invention, it is possible to produce a high-density and high-strength ceramic sinter by feeding a green molding produced in the manner described above to a sintering furnace and sintering the molding in the usual way.

The invention will now be further described by way of the embodiments thereof.

EXAMPLE 1

A finely divided ceramic powder was prepared from a mixture of 500 g of fine powder of silicon carbide containing 0.40% by weight of free carbon and 0.17% by weight of oxygen and having a specific surface area of 15.6 m²/g, with 97.3% by weight of said powder being composed of β crystal, 6.5 g of boron carbide powder obtained by pulverizing commercially available 200-mesh granular boron carbide and adjusting the specific surface area to 22.7 m²/g by grain classification and 10 g of carbon black having an average particle size of about 210 Å and a specific surface area of 124 m²/g. To this ceramic powder were added 260 ml of benzene and 28 g of polytetrafluoroethylene powder having an average particle size of 0.05 μm. The materials were mixed in a vibration mill for 4 hours and then dried while continuing the mixing in the mill. To 200 g of this mixture were added 210 ml of distilled water, 8 g of cellulose acetate and 2 g of tetramethylammonium hydroxide, and the mixture was subjected to a dispersion treatment in a ball mill for 10 hours, and then the suspension was taken out of the ball mill. The suspension on the fore side of the sieve was pressurized by using a diaphgram pump while giving vibrations of 15 Hz to the suspension by a motor-driven vibrator and under this condition the suspension was passed through the sieve. The sieve used here was one having a mesh size of 25 μm and a frame diameter of 20 mmφ, and a supersonic vibration of 26 kHz and 600 W was given to the suspension present close to the sieve on the fore side thereof. The pressure applied to the suspension was 2.0 kg/cm² at maximum and 0 kg/cm² at minimum, and it was varied from and to said maximum and minimum values at a period of 1 second. The pressure exerted to the suspension on the rear side of the sieve was released into the atmosphere. The suspension was passed through the sieve at a rate of 0.13 g/cm².sec. The viscosity of the suspension taken out of the ball mill, as measured by a Brookfield viscometer (speed: 60 r.p.m.; rotor: No. 4), was 130 g/cm.sec.

The suspension passed through the sieve was sprayed into a container kept at −60° to −70° C. to obtain a granular frozen product having an average particle size of 0.10 mm. This product was put into a container kept under 0.01 to 20 mmHg and at −5° to −10° C. and freeze-dried therein to obtain a granular dry mixture having a powder bulk density of 0.053 g/cm³.

A suitable amount was taken from this granular mixture, provisionally molded by a metal die under a pressure of 0.15 t/cm² and then molded by using a hydrostatic press under a pressure of 1.8 t/cm². The obtained green molding had a density of 1.93 g/cm³.

This green molding was put into a Tammann sintering furnace and sintered in an argon gas stream. In the sintering furnace, the green molding was heated at a rate of 5° C./min until reaching 1,650° C. from room temperature and, after maintained at 1,650° C. for 45 minutes, it was further heated at a rate of 5° C./min until reaching the highest temperature of 2,100° C. at which the molding was maintained for 30 minutes.

The obtained sinter had a density of 3.10 g/cm³ (equivalent to 96.6% of the theoretical value). This sinter was worked into a bar having dimensions of 3×3×30 mm and finally polished by 2 μm diamond abrasive grain, and this bar was subjected to a three-point bending test under the conditions of 20 mm span and 0.5 mm/min crosshead speed. The results showed that the product had an average bending strength of 73 kg/mm² at normal temperature and a Weibull factor of 12, indicating that this product was a sinter with an extremely high strength and a high reliability. The three-point bending strength was measured by conducting the test on 30 specimens, and the Weibull factor was determined by using a Weibull probability paper.

The "Weibull factor" is a numerical value determined from the relation between the breaking stress and probability of survival in the Weibull statistics generally used as a statistical indication method of ceramic strength, and it is used as a measure of reliability of the determined strength.

EXAMPLE 2

The green moldings were made from the same blend and by the same operation as in Example 1 but by using different types of fluororesin shown in Table 1, and sinters were obtained by sintering these green moldings in the same way as in Example 1. The results obtained in the similar way to Example 1 are shown in Table 1.

TABLE 1

| | Fluororesin | | | Properties of a sinter | |
|---|---|---|---|---|---|
| | Name | Av. particle size (μm) | Green molding density (g/cm³) | Density (g/cm³) | Bending strength (kg/mm²) |
| Example 2-1 | Polytrifluoro-chloroethylene | 0.07 | 1.90 | 3.09 | 71.9 |
| Example 2-2 | Tetrafluoro-ethylene/ hexafluoro- | 0.04 | 1.94 | 3.10 | 72.4 |

TABLE 1-continued

| | | Fluororesin | | Green molding density (g/cm³) | Properties of a sinter | |
|---|---|---|---|---|---|---|
| | Name | | Av. particle size (μm) | | Density (g/cm³) | Bending strength (kg/mm²) |
| Example 2-3 | propylene copolymer Polyvinylidene fluoride | | 0.04 | 1.92 | 3.11 | 73.6 |

EXAMPLE 3

The same finely divided ceramic product as that used in Example 1 and 260 ml of benzene were mixed for 30 hours in a ball mill filled with the polytetrafluoroethylene balls of 15 to 20 mm in diameter and then dried while mixing in said mill. The mixutre contained about 6% by weight of polytetrafluoroethylene powder having an average particle size of about 0.01 μm. To 200 g of this mixture were added 210 ml of distilled water, 24 g of polyacrylate ester and 3 g of condensed ammonium naphthalenesulfonate, and the mixture was dispersed by an attritor for 10 hours. The suspension was taken out of the attritor and subjected to a sieving treatment in the similar way to Example 1 but under the following conditions: the frequency of vibration given to the suspension: 10 Hz; the maximum pressure applied to the suspension: 1.8 kg/cm²; the minimum pressure: −0.2 kg/cm²; the period of pressure variation: ½ sec.; and the suspension passing rate: 0.25 g/cm.sec. The viscosity of the suspension measured in the same way as in Example 1 was 180 g/cm.sec.

The suspension passed through the sieve was spray-dried to obtain granules having an average particle size of 0.12 mm and a powder bulk density of 0.79 g/cm³.

A suitable amount of these granules was collected and a green molding was obtained by treating them by the same operation as in Example 1. The obtained molding had a density of 2.01 g/cm³.

Then this green molding was sintered by the same operation as in Example 1.

The obtained sinter had a density of 3.17 g/cm³ (corresponding to 98.7% of the theoretical value). The three-point bending strength of this sinter as measured after the manner of Example 1 was 87 kg/mm² (average strength) at normal temperature, and its Weibull factor was 13.

EXAMPLE 4

A powder composition for producing sintered ceramic was prepared from the same blend and by the same operation as in Example 3 but by using ethylene/fluoroethylene copolymer balls in place of the polytetralfluoroethylene balls to obtain a sinter therefrom.

The green molding had a density of 1.96 g/cm³ and the sinter had a density of 3.17 g/cm³ (corresponding to 98.6% of the theoretical value). The three-point bending test conducted on this sinter according to the method of Example 1 showed an average bending strength of 92 kg/mm² at normal temperature. The Weibull factor of this sinter was 13.

EXAMPLE 5 AND COMPARATIVE EXAMPLE 1

Sinters were produced in the same way as in Example 3 but by changing the fluororesin content, the sieving conditions and the molding pressure as shown in Table 2.

The results as determined after the manner of Example 1 are shown in Table 2.

TABLE 2

| | | Polytetrafluoroethylene | | | Sieving conditions | | | | | Pressure | | |
|---|---|---|---|---|---|---|---|---|---|---|---|---|
| | | Average particle size (μm) | Content (g) | Amount of dispersion medium (ml) | Suspension viscosity (g/cm·sec) | Suspension concentration (vol %) | Mesh size (μm) | Vibration frequency (Hz) | | Maximum (kg/cm²) | Minimum (kg/cm²) | Period of variation (second) |
| Example | 1 | 0.05 | 28 | 210 | 130 | 23 | 25 | 15 | | 2.0 | 0 | 1 |
| | 3 | 0.01 | 30 | " | 180 | " | " | 10 | | 1.8 | −0.2 | ½ |
| | 5-1 | " | 10 | " | 50 | " | " | 15 | | 2.0 | 0 | 1 |
| | 5-2 | " | 50 | 650 | 20 | 9 | " | 5 | | " | " | " |
| | 5-3 | " | " | 210 | 370 | 23 | 63 | 100 | | " | " | ½ |
| | 5-4 | " | " | " | " | " | 25 | 350 | | 4.0 | −0.3 | 1 |
| Comparative Example | 1-1 | " | 2 | " | 25 | " | " | 10 | | 2.0 | 0 | " |
| | 1-2 | " | 90 | 650 | 120 | 9 | " | " | | 4.0 | −0.2 | " |
| | 1-3 | " | 30 | 60 | 400 | 51 | 63 | 15 | | 1.8 | " | ½ |
| Example | 6-1 | " | " | 210 | 190 | 23 | 25 | 10 | | " | " | " |
| | 6-2 | " | 10 | " | 60 | " | " | " | | " | " | " |
| | 6-3 | " | 50 | " | 370 | " | " | " | | " | " | " |
| | 7 | 1.5 | " | " | 190 | " | " | " | | " | " | " |
| Comparative Example | 2 | 5.0 | 40 | " | 30 | " | " | " | | " | " | " |

| | | Granule properties | | | Green molding density (g/cm³) | Sinter | | |
|---|---|---|---|---|---|---|---|---|
| | | Powder bulk density (g/cm³) | Average particle size (mm) | Molding pressure (t/cm²) | | Density (g/cm³) | Strength (kg/mm²) | Weibull factor |
| Example | 1 | 0.53 | 0.10 | 1.8 | 1.93 | 3.10 | 73 | 12 |
| | 3 | 0.79 | 0.12 | " | 2.01 | 3.17 | 87 | 13 |
| | 5-1 | 0.78 | 0.11 | " | 1.97 | 3.13 | 78 | 9 |
| | 5-2 | 0.55 | " | " | 1.87 | " | 75 | 10 |

TABLE 2-continued

|  |  |  |  |  |  |  |  |  |
|---|---|---|---|---|---|---|---|---|
|  | 5-3 | 0.76 | 0.15 | " | 1.99 | 3.16 | 82 | 7 |
|  | 5-4 | " | 0.14 | " | 2.00 | " | 85 | 12 |
| Comparative Example | 1-1 | 0.75 | 0.11 | 2.5 | 1.97 | 3.13 | 70 | 8 |
|  | 1-2 | 0.50 | 0.12 | 1.8 | 1.77 | 3.12 | 71 | 7 |
|  | 1-3 | — | — | — | — | — | — | — |
| Example | 6-1 | 0.53 | 0.11 | 1.8 | 1.80 | 3.14 | 89 | 13 |
|  | 6-2 | 0.54 | " | 0.7 | 1.54 | 3.12 | 85 | 11 |
|  | 6-3 | 0.52 | 0.13 | " | 1.61 | " | 86 | 12 |
|  | 7 | 0.76 | 0.12 | 1.8 | 1.89 | 3.09 | 78 | 9 |
| Comparative Example | 2 | 0.75 | 0.11 | " | 1.86 | 3.05 | 68 | 6 |

As seen from the results shown in Table 2, when the fluororesin content was low as in Comparative Example 1—1, a very high molding pressure was required for obtaining a high-density green molding and the obtained sinter was also relatively low in bending strength. On the other hand, when the fluororesin content was high as in Comparative Example 1—2, the density of the green molding was relatively low and also the strength of the sinter was not satisfactorily high. In the case of Comparative Example 1—3 shown in the same table, the suspension was very hard to pass through the sieve because of its extremely high viscosity.

EXAMPLE 6

Green moldings were formed from the same blend and by the same operation as in Example 1 but by using a finely pulverized silicon carbide powder containing 0.42% by weight of free carbon and 0.20% by weight of oxygen and having a specific surface area of 36.8 m$^2$/g, with 96.1% by weight of the powder being composed of $\beta$ crystal, and by changing the fluororesin content and the molding pressure as shown in Table 2. Sinters were obtained by sintering these green moldings in the manner described in Example 1. The results obtained in the same way as in Example 1 are shown in Table 2.

As seen from the results shown in Table 2, all of the obtained sinters were strikingly high in strength and also appreciably high in reliability.

EXAMPLE 7 AND COMPARATIVE EXAMPLE 2

Sinters were obtained with the same blend as that used in Example 1 but by using the fluororesin of the particle sizes shown in Table 2, changing the amount of said resin blended and granulating the mixture by the method of Example 3. The results obtained in the same way as in Example 1 are shown in Table 2.

EXAMPLE 8

To a finely divided ceramic powder consisting of 300 g of silicon nitride powder having a purity of 98.2% by weight and a specific surface area of 7.3 m$^2$/g and 36 g of yttrium oxide powder having an average particle size of 0.8 $\mu$m were added 200 ml of distilled water and 18 g of polytetrafluoroethylene powder having an average particle size of 0.05 $\mu$m. The mixture was well mixed by a ball mill for 16 hours and then dried while mixing in the mill. To 300 g of this mixture were added 150 ml of benzene, 3 g of sorbitan monooleate and 1.5 g of polyethylene glycol, and the mixture was dispersed in a vibration mill for 6 hours. Then the suspension was removed from the vibration mill and subjected to a sieving treatment similar to that in Example 3 to obtain granules having an average particle size of 0.14 mm and a powder bulk density of 0.85 g/cm$^3$.

An appropriate amount was taken from these granules and treated after the manner of Example 1 to obtain a green molding with a density of 1.93 g/cm$^3$.

This green molding was charged in a Tammann sintering furnace and sintered in a nitrogen gas stream. The sintering was performed by increasing the temperature at a rate of 5° C./min. until reaching the maximum temperature of 1,650° C. which was maintained for one hour.

The obtained sinter had a density of 3.16 g/cm$^3$ (corresponding to 98.7% of the theoretical value). The three-point bending strength of this sinter as measured according to the method of Example 1 was 84.5 kg/mm$^2$ (average strength) at normal temperature.

EXAMPLE 9

200 ml of water and 15 g of polytetrafluoroethylene powder having an average particle size of 0.05 $\mu$m were added to a finely divided ceramic powder consisting of 300 g of calcined $\alpha$-alumina having a purity of 99.9% by weight and an average particle size of 5 $\mu$m and 6 g of magnesium fluoride power having an average particle size of 3 $\mu$m, and the materials were mixed by a ball mill for 16 hours and then dried while continuing the mixing in said mill. To 250 g of this mixture were added 200 ml of acetone, 1.5 g of polyethylene glycol and 1.5 g of sodium dioctyl sulfosuccinate, followed by a dispersion treatment by an attritor for 5 hours. The dispersion was withdrawn from the attritor and subjected to a sieving treatment after the manner of Example 3 to obtain granules having an average particle size of 0.09 mm and a powder bulk density of 1.05 g/cm$^3$.

A pertinent amount of these granules was taken and treated as in Example 1 to obtain a green molding having a density of 2.38 g/cm$^3$.

This green molding was placed in a Tammann sintering furnace and maintained at 1,900° C. for one hour.

The obtained sinter had a density of 3.92 g/cm$^3$ (corresponding to 98.7% of the theoretical value). It also showed an average three-point bending strength (determined as in Example 1) of 35.7 kg/mm$^2$ at normal temperature.

As described above, by using a powder composition for producing sintered ceramic according to this invention, it is possible to obtain a green molding with a high density and few molding defects under a relatively low molding pressure, and by sintering this green molding there can be produced sintered ceramic which is substantially free of defects and high in density and strength.

What is claimed is:

1. A powder composition for producing sintered ceramic comprising 100 parts by weight of a ceramic powder composed of one or more components and 0.5 to 15 parts by weight of a fluororesin, and being a granular preparation having a powder bulk density corresponding to 5–46% of the theoretical value and an average particle size within the range from 0.02 to 0.8 mm.

2. A powder composition according to claim 1 wherein said fluororesin is at least one substance selected from polytetrafluoroethylene, polytrifluorochloroethylene, tetrafluoroethylene/hexafluoropropylene copolymer, polyvinylidene fluoride, and ethylene/fluoroethylene copolymer.

3. A powder composition according to claim 1 or 2 wherein said fluororesin is a finely divided powder having an average particle size of 3 μm or less.

4. A powder composition according to claim 1 wherein said ceramic powder is a finely divided powder having an average particle size of 2 μm or less.

5. A powder composition according to claim 1 wherein said ceramic powder is composed principally of a silicon carbide powder having a specific surface area of 5 to 100 $m^2$/g and optionally containing a sintering assistant.

6. A powder composition according to claim 1, comprising at least one compound selected from the group consisting of silicon carbide, boron carbide, aluminum carbide, tungsten carbide, titanium carbide, tantalum carbide, silicon nitride, boron nitride, aluminum nitride, titanium nitride, zirconium nitride, steatite, forsterite, alumina, zircon beryllia, magnesia, mullite, cordierite, aluminum titanate and zirconia.

* * * * *